(12) United States Patent
Quint et al.

(10) Patent No.: US 8,140,067 B1
(45) Date of Patent: Mar. 20, 2012

(54) SYSTEMS AND METHODS FOR CALL ANALYSIS

(75) Inventors: Joe B. Quint, Overland Park, KS (US); Ronald Louis House, Stilwell, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1113 days.

(21) Appl. No.: 11/968,768

(22) Filed: Jan. 3, 2008

(51) Int. Cl.
*H04W 24/00* (2009.01)

(52) U.S. Cl. .................. 455/423; 455/67.11; 455/456.1; 455/422.1; 455/424

(58) Field of Classification Search .......... 455/423–425, 455/67.11, 456.1
See application file for complete search history.

(56) References Cited

U.S. PATENT DOCUMENTS

| | | | | |
|---|---|---|---|---|
| 5,442,679 A * | 8/1995 | Regis et al. | ................. | 379/32.02 |
| 5,697,056 A * | 12/1997 | Tayloe | ......................... | 455/513 |
| 6,438,376 B1 * | 8/2002 | Elliott et al. | .................. | 455/437 |
| 6,587,686 B1 * | 7/2003 | Cuffaro et al. | ................ | 455/423 |
| 6,711,404 B1 * | 3/2004 | Arpee et al. | .................... | 455/423 |
| 6,718,169 B1 * | 4/2004 | Martti et al. | ................... | 455/424 |
| 6,915,128 B1 * | 7/2005 | Oh | ................................. | 455/424 |
| 7,149,476 B2 * | 12/2006 | Shah | ......................... | 455/67.11 |
| 7,174,152 B1 * | 2/2007 | Oleniczak et al. | ......... | 455/404.1 |
| 7,941,108 B2 * | 5/2011 | Shaffer et al. | .............. | 455/115.3 |
| 2005/0256694 A1 * | 11/2005 | Taylor | ............................ | 703/22 |
| 2006/0075131 A1 | 4/2006 | Douglas et al. | | |
| 2006/0270400 A1 * | 11/2006 | DaSilva et al. | ............... | 455/423 |

* cited by examiner

*Primary Examiner* — Sharad Rampuria

(57) ABSTRACT

A method of operating a computer system comprises receiving per call measurement (PCM) data associated with a radio access network, processing the PCM data to perform a rolling average analysis of dropped calls by the radio access network, processing the rolling average analysis to determine if a location analysis is required, in response to determining that the location analysis is required, processing the PCM data to perform the location analysis of the dropped calls, and processing the location analysis to determine if a response is required.

12 Claims, 13 Drawing Sheets

SYSTEMS AND METHODS FOR CALL ANALYSIS

BACKGROUND

Modern wireless networks, such as cell phone networks, often operate in areas having obstacles to signal propagation, including topographical obstacles, buildings, tunnels, and overpasses. These obstacles may cause signal loss when they impede wireless signals, resulting in dropped calls in a cell phone network. Occasionally, network equipment, such as base station equipment, may malfunction, also resulting in dropped calls. This performance degradation creates dissatisfaction amongst customers and leads to complaints that must be remedied.

Unfortunately, it can be difficult to determine if such performance degradation is caused by equipment failure, as opposed to physical obstacles to proper signal propagation, without dispatching a technician to physically inspect the equipment. In the case of equipment failure, the technicians must attempt to diagnosis and repair the equipment. However, in the case when the network equipment is operating normally, but physical obstacles impede proper signal propagation, dispatching a technician to the location of physical equipment is wasteful and expensive. Thus, network providers may wish to minimize physical responses to only those situations with an equipment malfunction and to eliminate physical responses where the signal loss or dropped calls are due to other reasons.

Overview

In order to determine whether or not a physical response is necessary in response to dropped calls, a method including the operations of receiving per call measurement (PCM) data associated with a radio access network, processing the PCM data to perform a rolling average analysis of dropped calls by the radio access network, processing the rolling average analysis to determine if a location analysis is required, in response to determining that the location analysis is required, processing the PCM data to perform the location analysis of the dropped calls and processing the location analysis to determine if a response is required, is used to eliminate physical responses when the dropped calls are not due to equipment malfunctions, but rather, to other reasons.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In a wireless network including a multitude of mobile devices, such as cell phones, data is collected for each call. This data may include such information as the distance of the mobile device from the network hub (or cell tower, in the case of a cell phone network), location of the mobile device, and call status data such as whether or not the call was dropped before completion. Monitoring systems track this data and may trigger alerts when the data show possible malfunctions of the equipment. Since physical responses to alerts may be very expensive depending on the location of the equipment, it is desirable to only respond when there is an actual problem with the equipment. Since problems, such as dropped calls, may result from a variety of causes, it is desirable to separate dropped calls due to equipment problems from dropped calls due to other reasons, such as topography.

Figure 1:
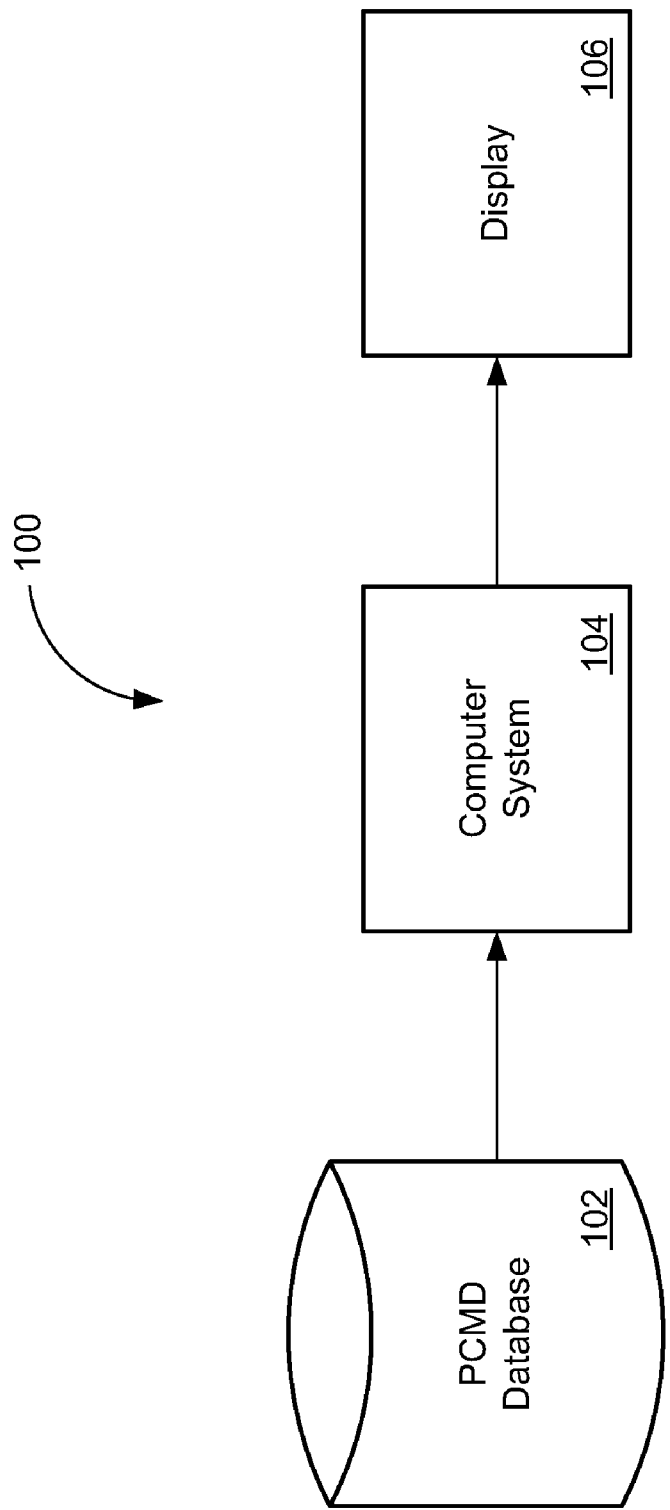
FIG. 1 is a block diagram of a system for analyzing and displaying per call measurement location data.
Figure 12:
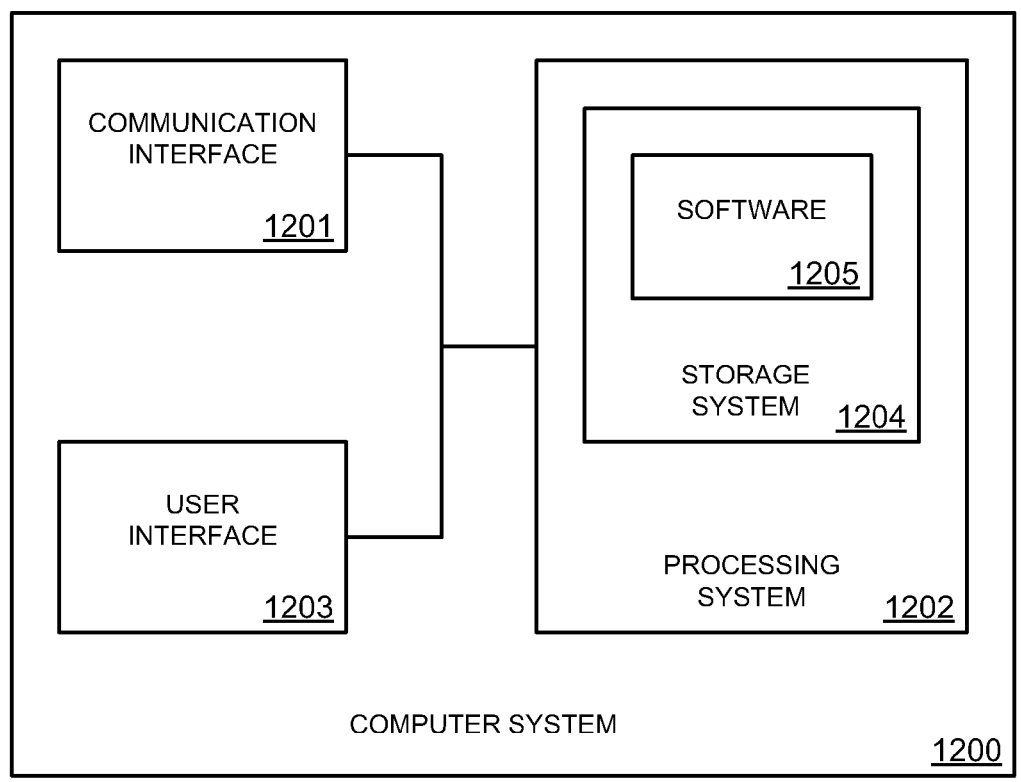
FIG. 12 illustrates a block diagram of a computer system.

FIG. 1 is a block diagram of a system 100 for analyzing and displaying per call measurement location data in an embodiment of the invention. In this example embodiment of the present invention, a computer system 104, such as that shown in FIG. 12, is coupled with a database containing per call measurement data (PCMD) 102, and a display 106. The per call measurement data contains information about each call in an area associated with a radio access network. This information includes such parameters as the location of the call and whether or not the call was dropped.

The computer system 104 is configured to perform a rolling average analysis of dropped calls within the radio access network and to process this rolling average to determine if a location analysis is required. For example, the computer system 104 may be configured to perform a location analysis whenever the rolling average of dropped calls rises above a threshold. This dropped call threshold may be a fixed value or may be dependent upon a previous rolling average of dropped calls. For example, if the number of dropped calls within a certain time period exceeds the rolling average of dropped calls for similar time periods by some amount (either a percentage or a fixed difference), a location analysis may be required. If a location analysis is required, the computer system 104 is also configured to process the PCM data to perform the location analysis of the dropped calls and to further process the location analysis to determine if a response is required.

Figure 2:
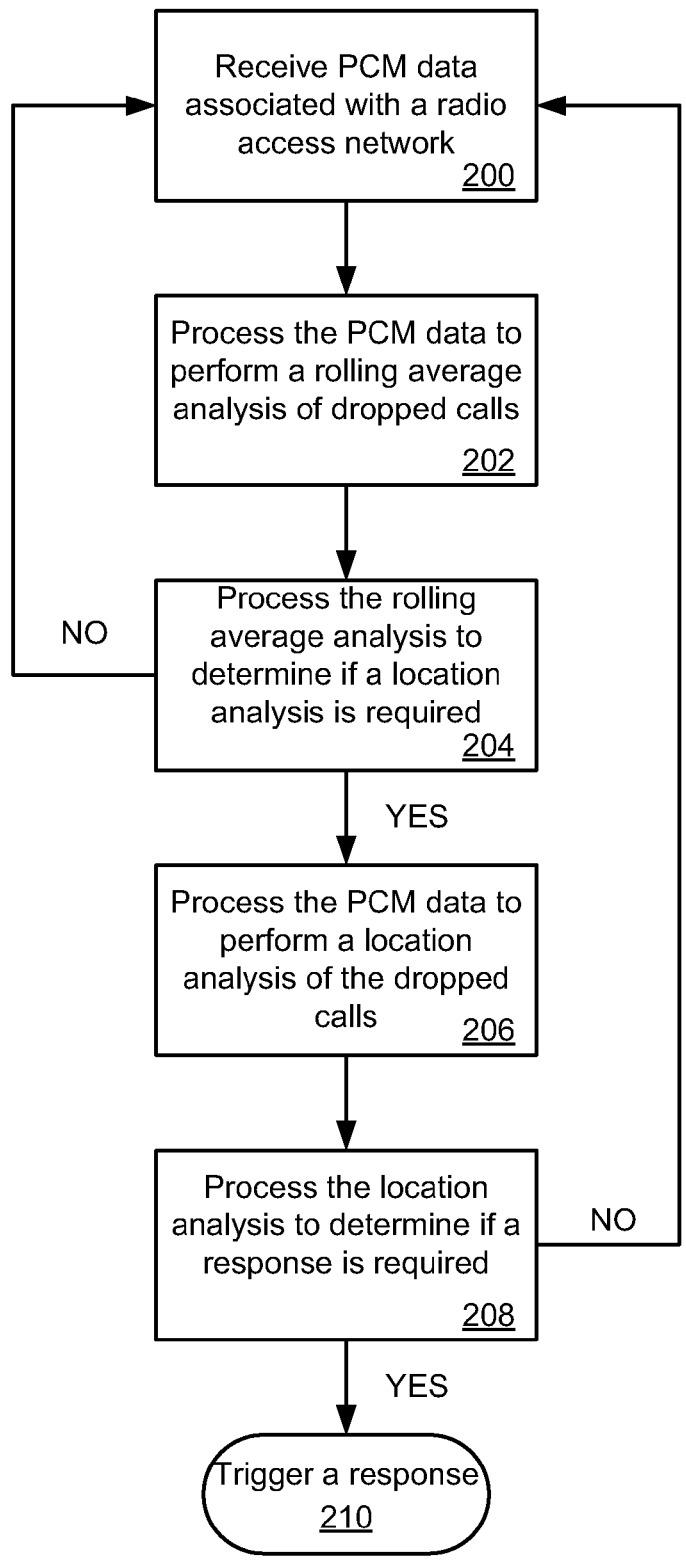
FIG. 2 is a flowchart illustrating a method of operating a computer system.

FIG. 2 is a flowchart illustrating a method of operating the computer system 104 in an embodiment of the invention. In operation 200, per call measurement (PCM) data associated with a radio access network is received. In operation 202, the PCM data is processed to perform a rolling average analysis of dropped calls. In operation 204, the rolling average analysis is processed to determine if a location analysis is required. Those of skill in the art will recognize that there are a wide variety of methods available to process a rolling average analysis of data and trigger further analysis of suspect occurrences, all within the scope of the present invention. For example, if the number of dropped calls within a certain time period exceeds the rolling average of dropped calls for similar time periods by some amount (either a percentage amount or a fixed difference), a location analysis may be required.

In operation 206, if a location analysis is required, the PCM data is processed to perform a location analysis of the dropped calls. Location analyses may be performed in a variety of ways all within the scope of the present invention. Example location analyses are illustrated in FIGS. 4 through 8 and described in detail below. If no location analysis is required, the method returns to operation 200 where the PCM data is received.

In operation 208, the location analysis is processed to determine if a response is required. In operation 210, if the processing of the location analysis determines that a response is required, a response is triggered.

Figure 5:
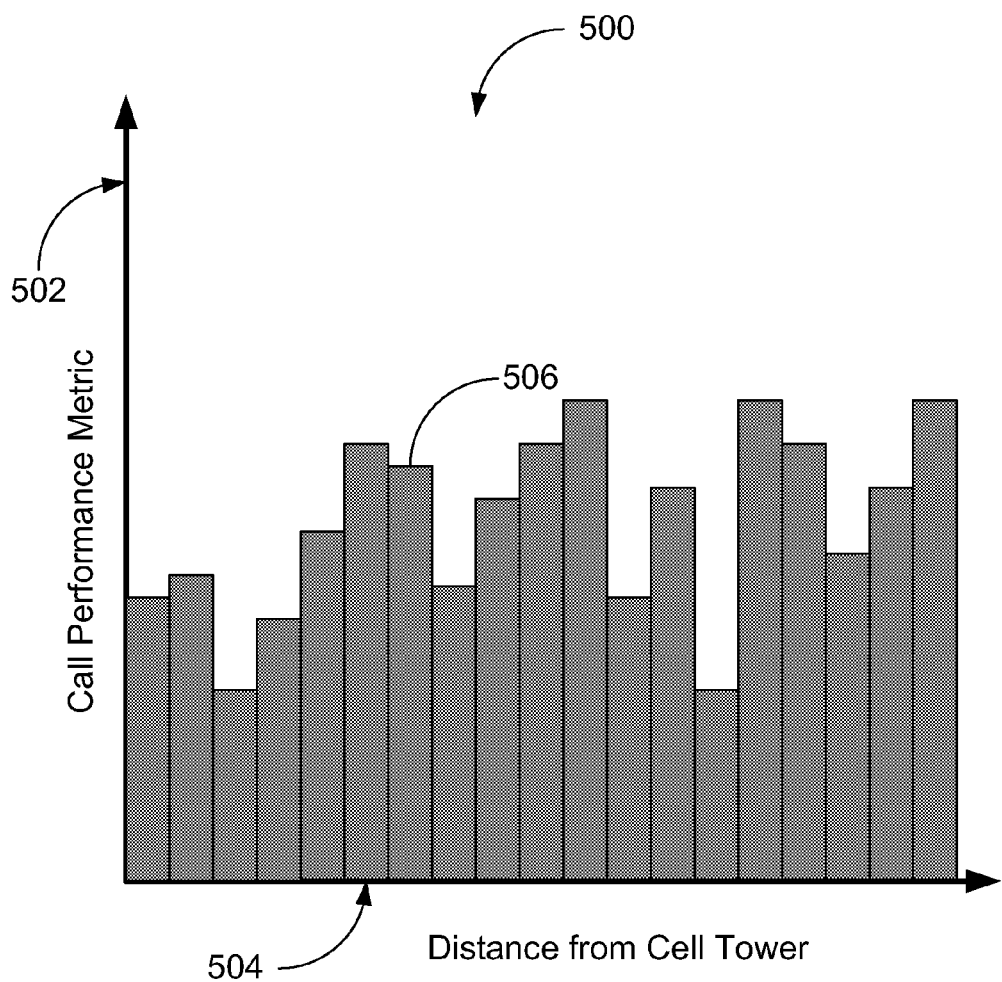
FIG. 5 is an illustration of a location analysis.
Figure 7:
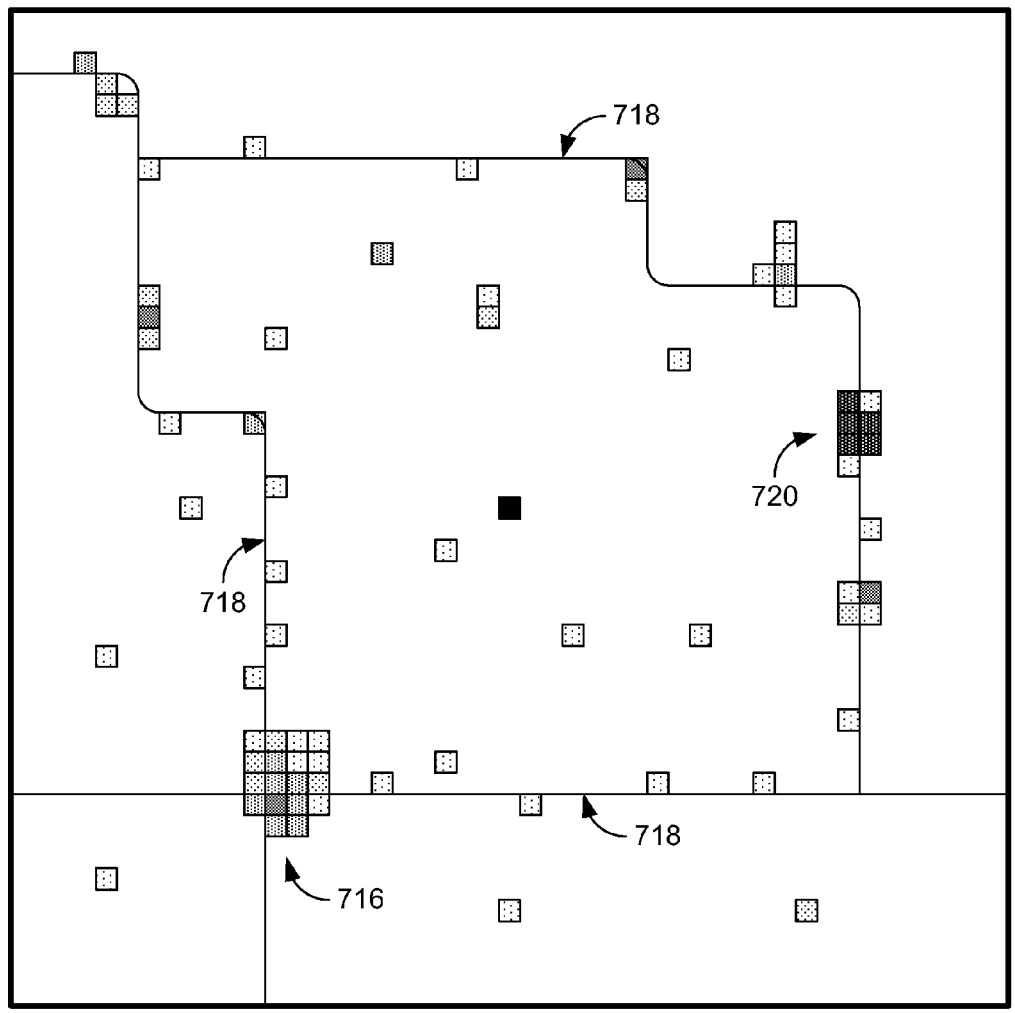
FIG. 7 is an illustration of a location analysis.
Figure 8:
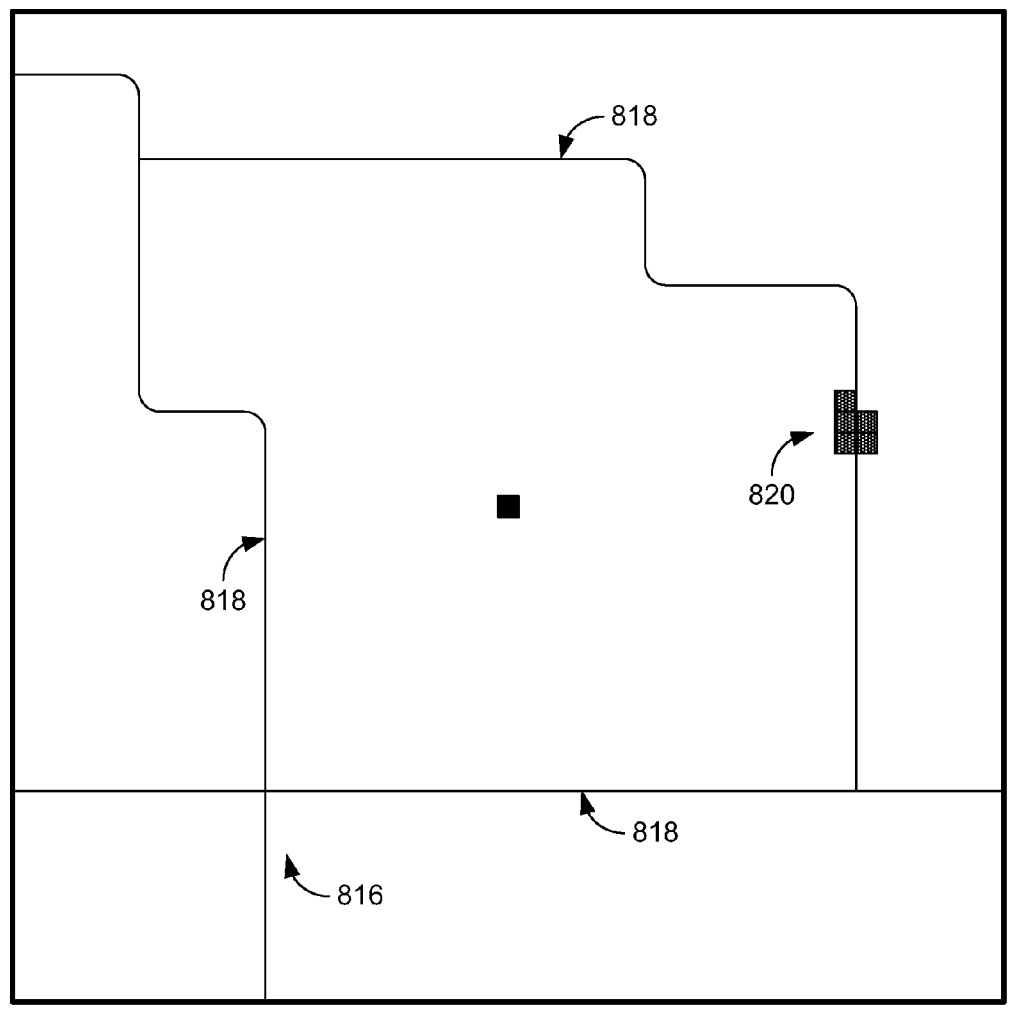
FIG. 8 is an illustration of a location analysis.

Processing of the location analysis is performed to distinguish between radio access network problems that require a response and those problems that are not due to the radio access network hardware and so do not require a response. For example, if the location of the majority of dropped calls is clustered within a single building, most likely the dropped calls are due to interference from the building itself and not due to a problem with the radio access network hardware. In such a case, triggering a response to diagnose the radio access network is unnecessary, and the expense of the response may be avoided. This example is illustrated in FIGS. 5 and 7 and described in detail below. However, if the location analysis shows that the dropped calls are located throughout a large area, there may be a problem with the radio access network hardware, and a response is required to diagnose the problem. This example is illustrated in FIG. 8 and described in detail below. If no response is required, the method returns to operation 200 where the PCM data is received.

Figure 3:
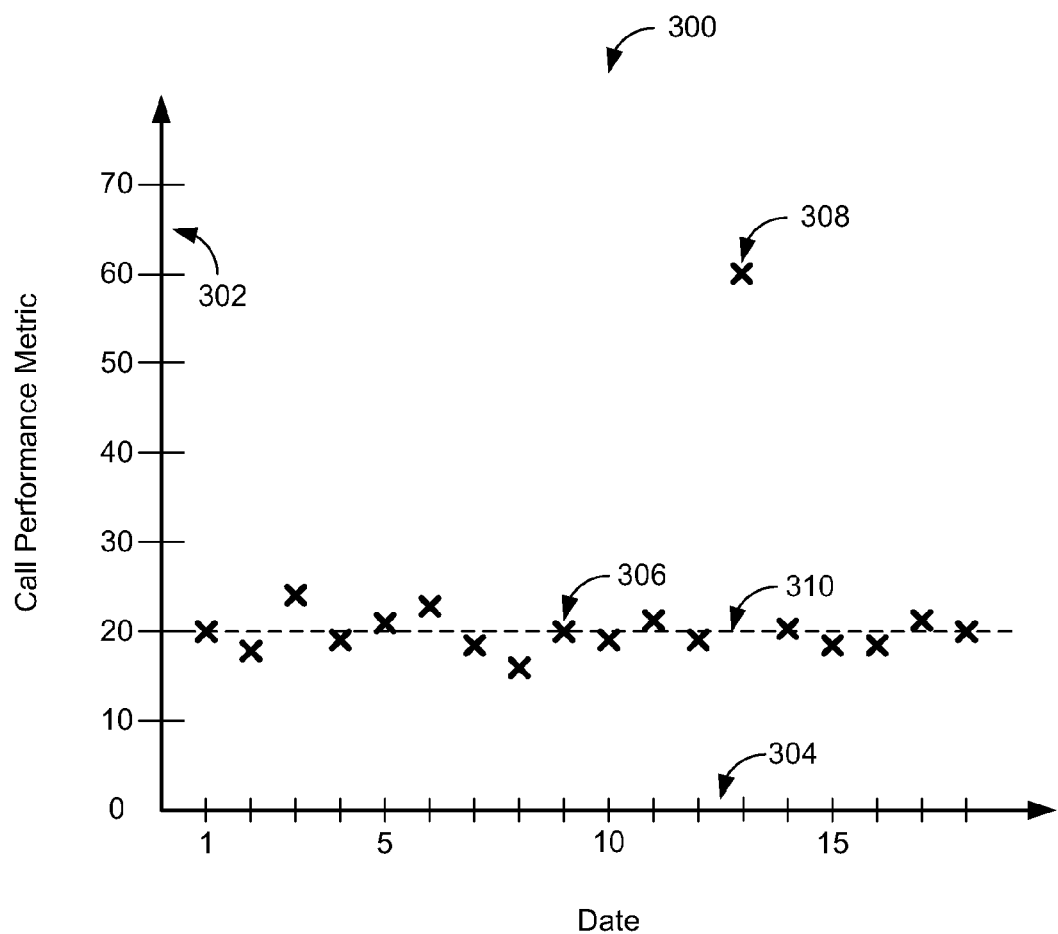
FIG. 3 is an illustration of a rolling average analysis.

FIG. 3 is an illustration of a rolling average analysis performed by the computer system 104 in an embodiment of the invention. This example graph 300 plots a call performance metric along the vertical axis 302 and the date along the horizontal axis 304. In this example, individual data points 306 are shown along with a dashed line showing the rolling average 310 of the data points for the call performance metric. This call performance metric may be the number of dropped calls within a time period. Other embodiments may use other call performance metrics within the scope of the present invention. Each data point 306 represents the number of dropped calls within each day plotted along the horizontal axis 304. In this example, one data point 308 has a much higher number of dropped calls than the rolling average 310, and so it may trigger a location analysis.

Figure 4:
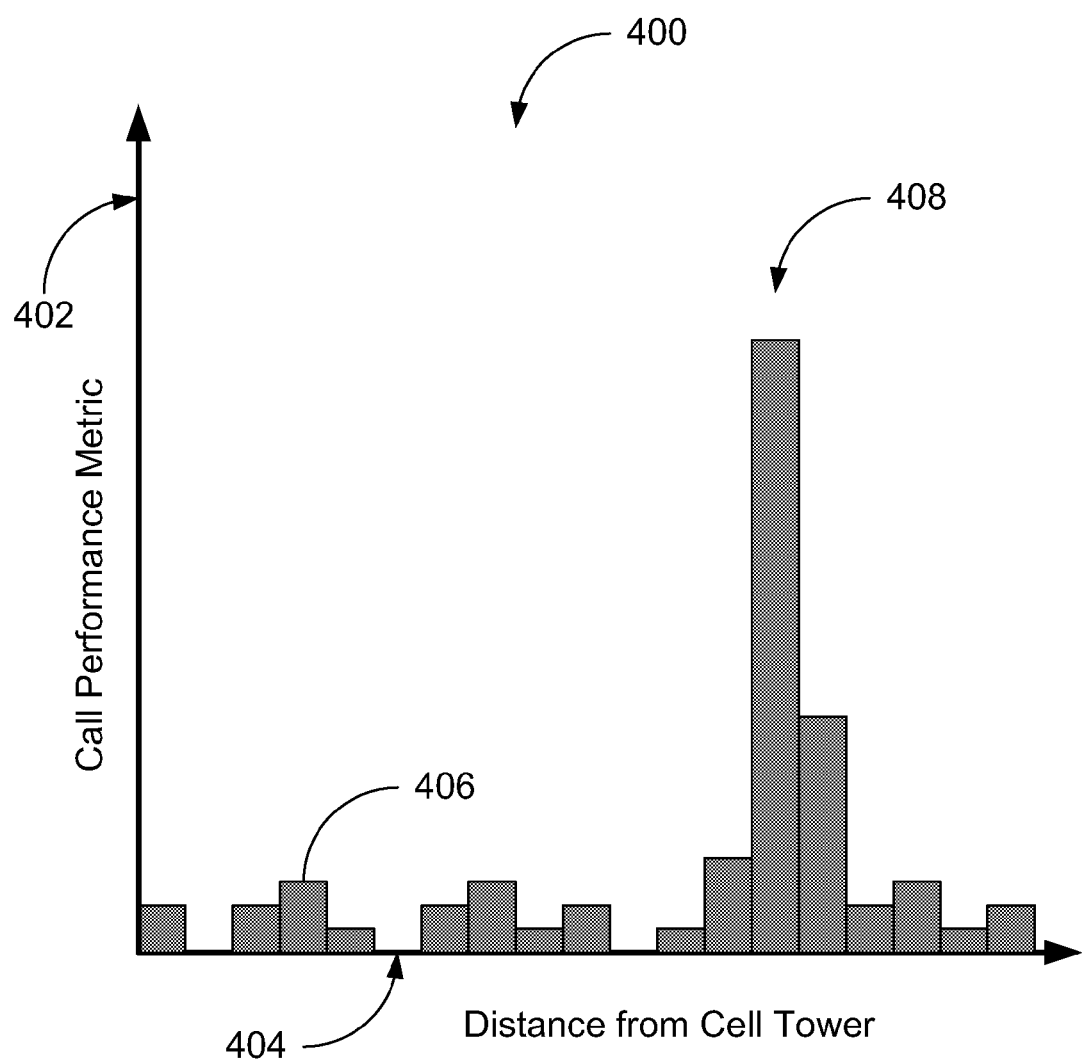
FIG. 4 is an illustration of a location analysis.

FIG. 4 is an illustration of a location analysis performed by the computer system 104 in an embodiment of the invention. This example histogram 400 plots a call performance metric, such as dropped calls, along the vertical axis 402 and the distance from a cell tower along the horizontal axis 404. In this example histogram, the call performance metric 406 is plotted against distance from a cell tower. Notice that this example histogram has one large spike 408 in dropped calls at a particular distance from the cell tower. This suggests that most of the dropped calls are confined to a small area, and so the problem is most likely not a fault in the cell tower, and there should be no reason to trigger a response to the cell tower.

FIG. 5 is an illustration of a location analysis performed by the computer system 104 in an embodiment of the invention. This example histogram 500 plots a call performance metric along the vertical axis 502 and the distance from a cell tower along the horizontal axis 504. In this example histogram, the call performance metric 506, such as dropped calls, is plotted against distance from a cell tower. Notice that in this example histogram, the dropped calls seem to be somewhat evenly spread across the various distances from the cell tower. Since the dropped calls are not localized, it is more likely that a problem with the cell tower exists, and it is necessary to trigger a response to the cell tower to further diagnose, and to repair, the problem.

Figure 6:
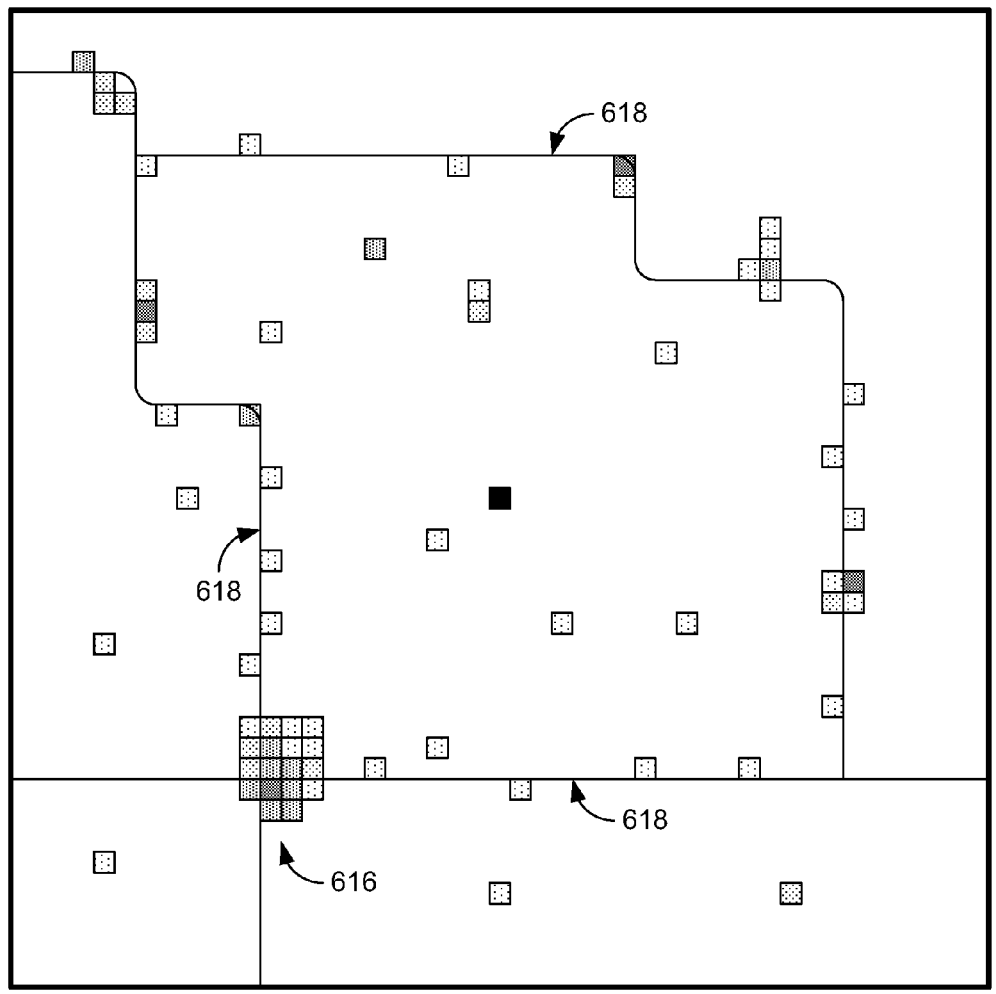
FIG. 6 is an illustration of a location analysis.

FIG. 6 is an illustration of a location analysis performed by the computer system 104 in an embodiment of the invention. In this example embodiment, a map of a radio access network 600 includes a cell tower 602, some roads 618, and a city 616. In this illustration, different degrees of shading are used to represent the quantity of dropped calls at each location. Locations without any dropped calls 604 are left unshaded. Locations with a quantity of dropped calls less than a value T1 and greater than 0 have a first shade 606. Locations with a quantity of dropped calls less than a value T2 and greater than or equal to value T1 have a second shade 608. Locations with a quantity of dropped calls less than a value T3 and greater than or equal to value T2 have a third shade 610. Locations with a quantity of dropped calls less than a value T4 and greater than or equal to value T3 have a fourth shade 612. Locations with a quantity of dropped calls greater than or equal to value T4 have a fifth shade 614. These shaded locations may then be laid over a map of the area such that areas having large quantities of dropped calls are easily detected.

Notice that in this example embodiment, the distribution of dropped calls is not uniform. Even when the radio access network is working completely within specifications, there will still be a quantity of dropped calls due to user error, or movement of the user into shielded areas such as an underpass or basement.

Also, areas from where a large number of calls are made will most likely have more dropped calls than rural areas simply due to the distribution of calls. If no calls are made from a given location, that location cannot have any dropped calls. In this example location analysis, a number of dropped calls are detected from a location corresponding to the city 616. As long as this quantity does not drastically increase, it is likely that these dropped calls are not due to equipment in the cell tower, and no response is necessary. This map may then be used as a normal map since it represents a normal quantity of dropped calls for the area illustrated.

FIG. 7 is an illustration of a location analysis performed by the computer system 104 in an embodiment of the invention. In this example embodiment, a map of a radio access network 700 includes a cell tower 702, some roads 718, and a city 716. In this illustration, different degrees of shading are used to represent the quantity of dropped calls at each location. Locations without any dropped calls 704 are left unshaded. Locations with a quantity of dropped calls less than a value T1 and greater than 0 have a first shade 706. Locations with a quantity of dropped calls less than a value T2 and greater than or equal to value T1 have a second shade 708. Locations with a quantity of dropped calls less than a value T3 and greater than or equal to value T2 have a third shade 710. Locations with a quantity of dropped calls less than a value T4 and greater than or equal to value T3 have a fourth shade 712. Locations with a quantity of dropped calls greater than or equal to value T4 have a fifth shade 714. These shaded locations may then be laid over a map of the area such that areas having large quantities of dropped calls are easily detected.

Notice that in this example embodiment, a large quantity of dropped calls has appeared grouped in a single location 720. Comparing this illustration with a map of normal operation, such as that illustrated in FIG. 6, it is clear that the overall quantity of dropped calls has increased, but the increase is confined to a single location. This tends to indicate that there is something specific to that location causing the dropped calls, since the quantity of dropped calls elsewhere has not increased. Thus, there most likely is no need to send a physical response to the cell tower in this case.

FIG. 8 is an illustration of a location analysis performed by the computer system 104 in an embodiment of the invention. In this example embodiment, a map of a radio access network 800 includes a cell tower 802, some roads 818, and a city 816. In this illustration, different degrees of shading are used to represent the quantity of dropped calls at each location. Locations without any dropped calls 804 are left unshaded. Locations with a quantity of dropped calls less than a value T1 and greater than 0 have a first shade 806. Locations with a quantity of dropped calls less than a value T2 and greater than or equal to value T1 have a second shade 808. Locations with a quantity of dropped calls less than a value T3 and greater than or equal to value T2 have a third shade 810. Locations with a quantity of dropped calls less than a value T4 and greater than or equal to value T3 have a fourth shade 812. Locations with a quantity of dropped calls greater than or equal to value T4 have a fifth shade 814. This example location analysis was obtained by subtracting the data illustrated in FIG. 6 from the data illustrated in FIG. 7. If FIG. 6 is thought of as a normal map, this illustration is a difference map showing the locations from FIG. 7 having a greater than normal quantity of dropped calls. This difference map may then be analyzed to see that all of the extra dropped calls are confined to a single location 820.

Notice that the city 816 had only its normal quantity of dropped calls and so it does not show up in this difference map. Since only one location shows a greater than normal quantity of dropped calls, it is likely that these dropped calls are due to a local effect and not due to an equipment malfunction in the cell tower. Thus, it is not necessary to trigger a physical response to this increase in dropped calls. Those of skill in the art will recognize that a similar difference method may be used with the histograms of FIGS. 4 through 5 within the scope of the present invention.

Figure 9:
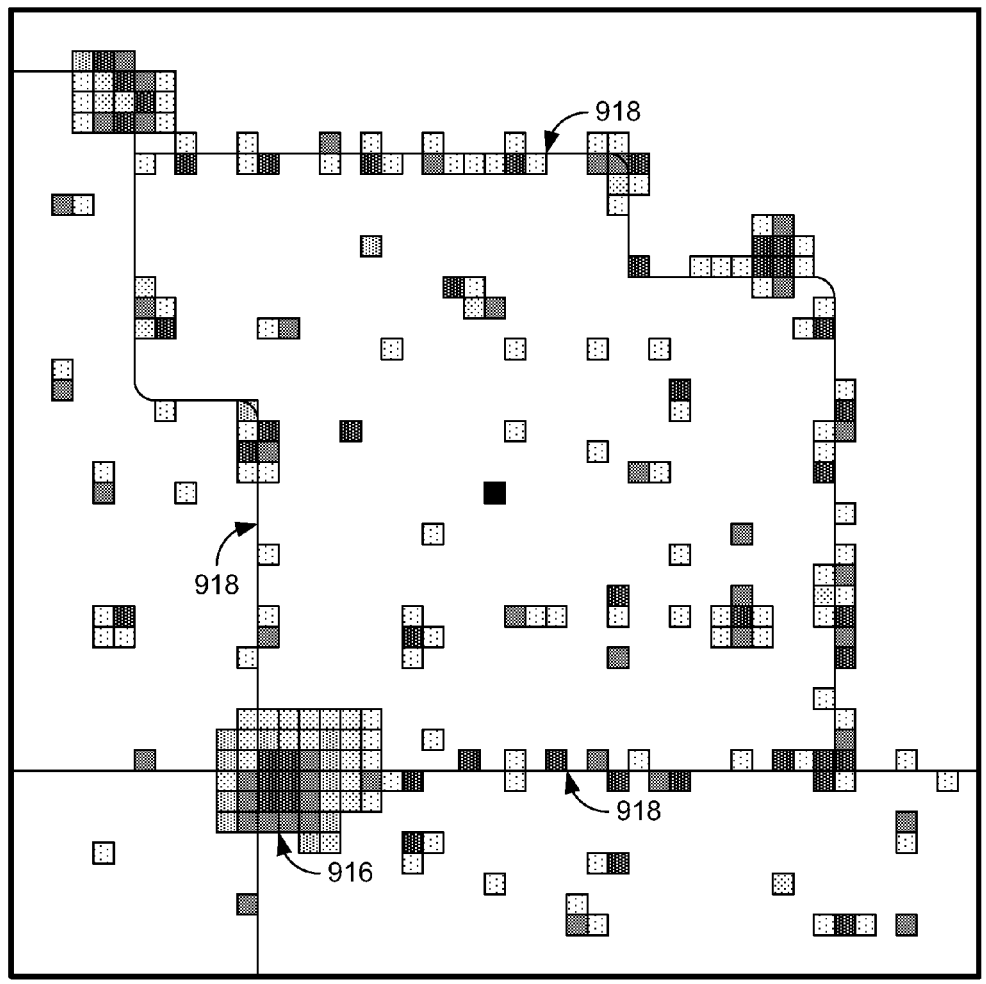
FIG. 9 is an illustration of a location analysis.

FIG. 9 is an illustration of a location analysis performed by the computer system 104 in an embodiment of the invention. In this example embodiment, a map of a radio access network 900 includes a cell tower 902, some roads 918, and a city 916. In this illustration, different degrees of shading are used to represent the quantity of dropped calls at each location. Locations without any dropped calls 904 are left unshaded. Locations with a quantity of dropped calls less than a value T1 and greater than 0 have a first shade 906. Locations with a quantity of dropped calls less than a value T2 and greater than or equal to value T1 have a second shade 908. Locations with a quantity of dropped calls less than a value T3 and greater than or equal to value T2 have a third shade 910. Locations with a quantity of dropped calls less than a value T4 and greater than or equal to value T3 have a fourth shade 912. Locations with a quantity of dropped calls greater than or equal to value T4 have a fifth shade 914. These shaded locations may then be laid over a map of the area such that areas having large quantities of dropped calls are easily detected.

Notice that in this example embodiment, there are a large number of dropped calls throughout the radio access network. Comparing this illustration with a map of normal operation, such as that illustrated in FIG. 6, it is obvious that the overall quantity of dropped calls has increased, and this increase is seen throughout the network. This suggests that there may be an equipment problem in the cell tower, and a physical response to the cell tower will be necessary to analyze and correct the malfunction.

Figure 10:
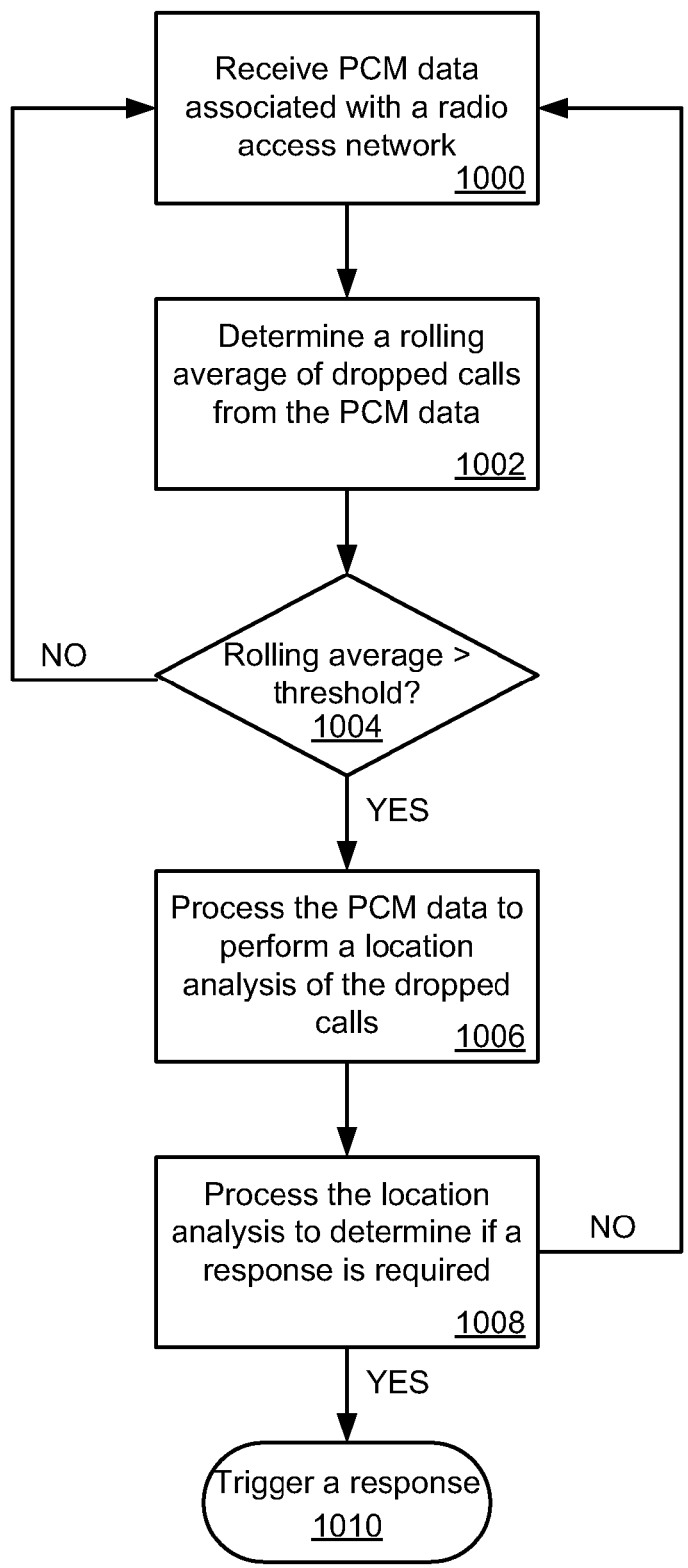
FIG. 10 is a flowchart of a method for operating a computer system.

FIG. 10 is a flowchart of a method performed by the computer system 104 in an embodiment of the invention. In an operation 1000, PCM data associated with a radio access network is received. In an operation 1002, a rolling average of dropped calls is determined from the PCM data, similar to that illustrated in FIG. 3. In an operation 1004, the rolling average of dropped calls is compared to a threshold. If the rolling average is less than or equal to the threshold, control is returned to operation 1000, and more PCM data is received. If the rolling average is greater than the threshold, control proceeds to operation 1006, and the PCM data is processed to perform a location analysis of the dropped calls such as those shown in FIGS. 4 through 9. In an operation 1008, the location analysis is processed to determine if a response is required. This processing is similar to that described with respect to FIGS. 4 through 9. If no response is required, control is passed to operation 1000, and more PCM data is received. If the processing of the location analysis determines that a response is required, a response is triggered in operation 1010.

Figure 11:
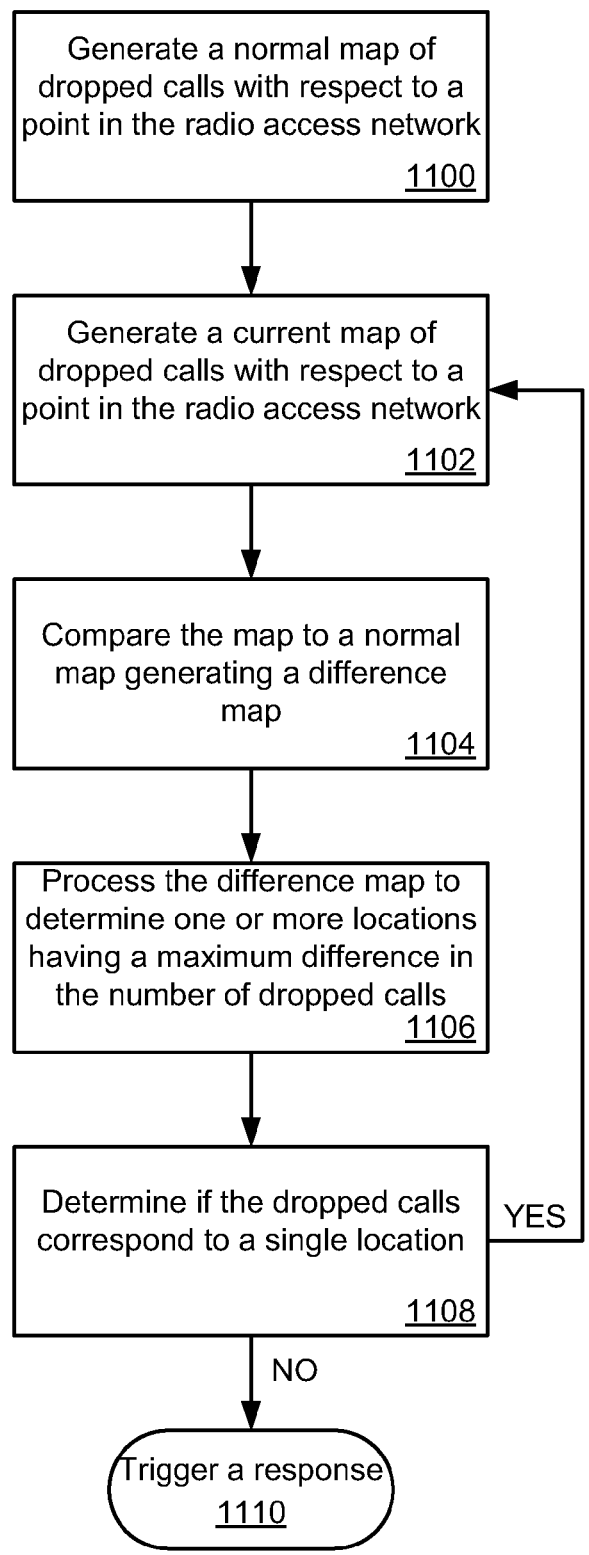
FIG. 11 is a flowchart of a method for operating a computer system.

FIG. 11 is a flowchart of a method of location analysis performed by the computer system 104 to determine if a response is required in an embodiment of the invention. In an operation 1100, a normal map, such as that illustrated in FIG. 6, is generated. In an operation 1102, a current map, such as that illustrated in FIG. 7, is generated.

In an operation 1104, a difference map is generated by comparing or subtracting the data of the normal map from the data of the current map, resulting in a difference map such as that illustrated in FIG. 8.

In an operation 1106, the difference map is processed to determine one or more locations having a greater than normal quantity of dropped calls. Those of skill in the art will recognize that there are a wide variety of methods available to process the difference map to determine locations having a greater than normal quantity of dropped calls, all within the scope of the present invention.

In an operation 1108, if the increase in dropped calls is limited to a single location, control is passed to operation 1102, and another current map is generated. If the increase in dropped calls is not limited to a single location, a response is triggered in operation 1110. Those of skill in the art will recognize that other embodiments may allow more than one location with an increase in dropped calls without triggering a response. For example, some systems may allow two, three, or more locations to show an increase in dropped calls before triggering a response, all within the scope of the present invention.

FIG. 12 illustrates a block diagram of a computer system 1200 in an embodiment of the invention. The computer system 1200 includes a communication interface 1201, a processing system 1202, and a user interface 1203. The processing system 1202 includes a storage system 1204. The storage system 1204 stores software 1205. The processing system 1202 is linked to the communication interface 1201 and the user interface 1203. The computer system 1200 could be comprised of a programmed general-purpose computer, although those skilled in the art will appreciate that programmable or special purpose circuitry and equipment may be used. The computer system 1200 may be distributed among multiple devices that together comprise elements 1201-1205.

The communication interface 1201 could comprise a network interface, modem, port, transceiver, or some other communication device. The communication interface 1201 may be distributed among multiple communication devices. The processing system 1202 could comprise a computer microprocessor, logic circuit, or some other processing device. The processing system 1202 may be distributed among multiple processing devices. The user interface 1203 could comprise a keyboard, mouse, voice recognition interface, microphone and speakers, graphical display, touch screen, or some other type of user device. The user interface 1203 may be distributed among multiple user devices. The storage system 1204 could comprise a disk, tape, integrated circuit, server, or some other memory device. The storage system 1204 may be distributed among multiple memory devices. The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture where various components are situated remote from one another but can be accessed by the processor. Additionally, the memory includes an operating system, as well as instructions associated with methods for image processing. Exemplary embodiments of each are described above.

The processing system 1202 retrieves and executes the software 1205 from the storage system 1204. The software 1205 may comprise an operating system, utilities, drivers, networking software, and other software typically loaded onto a computer system. The software 1205 could comprise an application program, firmware, or some other form of machine-readable processing instructions. When executed by the processing system 1202, the software 1205 directs the processing system 1202 to operate as described herein. In this example embodiment of the present invention, the software 1205 may be configured to cause the processing system 1202 to execute the operations of the methods illustrated in FIGS. 2 through 10 as described for the computer system 104. The storage system 1204 may be configured to store the retrieved PCM data and results of the methods illustrated in FIGS. 2 through 10, such as the moving average, trigger amount, normal maps, and records of alerts.

Figure 13:
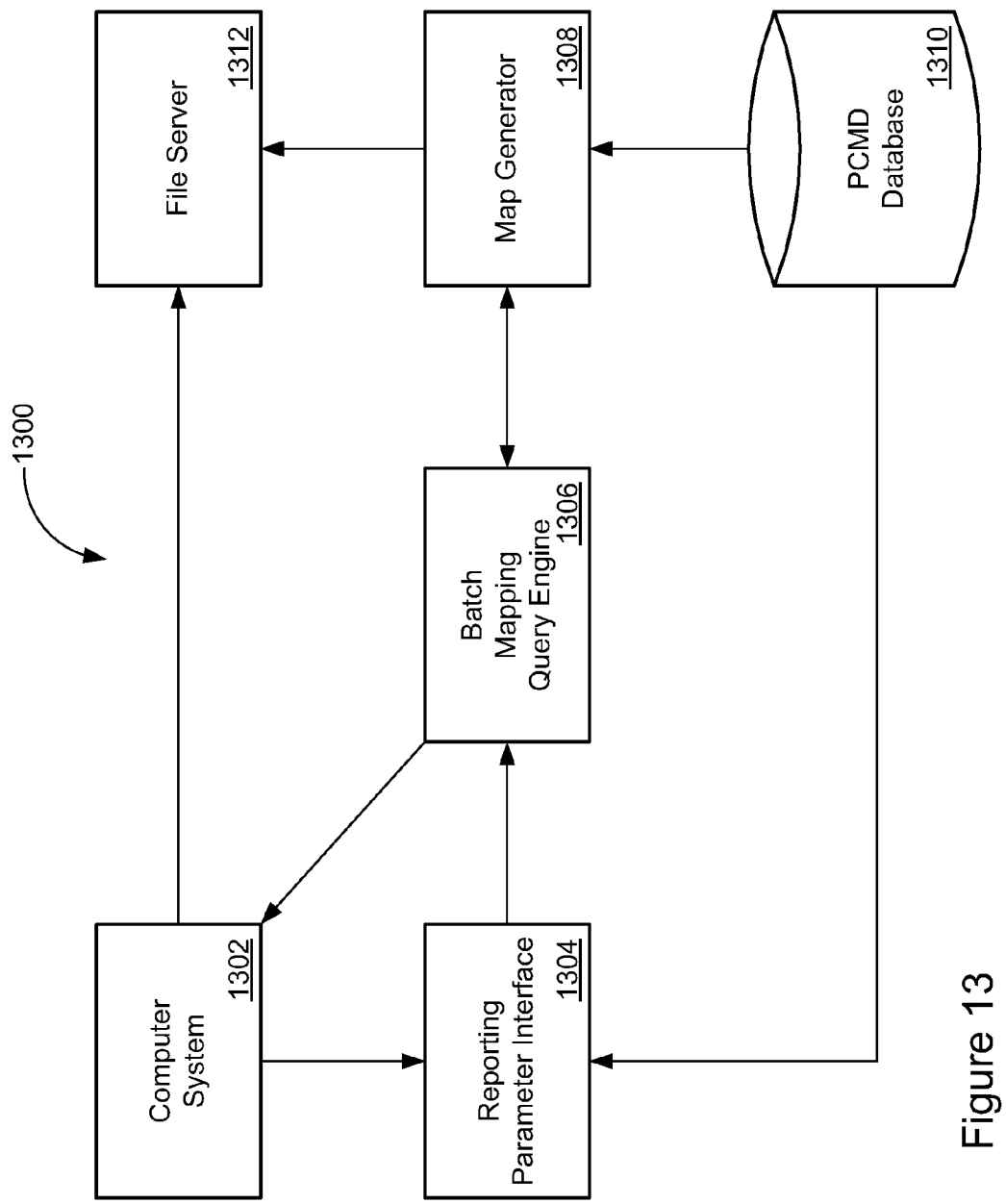
FIG. 13 is a block diagram of a system for analyzing and displaying per call measurement location data.

FIG. 13 is a block diagram of a system 1300 for analyzing and displaying per call measurement location data in an embodiment of the invention. In this example embodiment, a computer system 1302 is coupled to a reporting parameter interface 1304, a file server 1312, and a batch mapping query engine 1306. The reporting parameter interface 1304 is also coupled to the batch mapping query engine 1306 and a PCMD database 1310. A map generator 1308 is coupled to the batch mapping query engine 1306, the PCMD database 1310, and the file server 1312.

The reporting parameter interface 1304 receives the PCM data from the database 1310, and triggers a location analysis when necessary. The map generator 1308 generates the maps and histograms of the dropped calls such as those illustrated in FIGS. 4 through 8. The batch mapping query engine 1306 processes the dropped call histograms to determine if a response is necessary, and if so, communicates to the user at the computer system 1302. The file server 1312 may be used to store the maps and histograms of the dropped calls generated by the map generator 1308. Those of skill in the art will recognize that these parts of the system for analyzing and displaying call measurement location data 1310 may be contained within one or more physical systems in any combination, all within the scope of the present invention. For example, the computer system 1302, reporting parameter interface 1304, batch mapping query engine 1306, map generator 1308, and file server 1312, may all be contained within a single computer system 1302, such as that illustrated in FIGS. 1 and 12 in one example embodiment of the present invention. Other example architectures may include remote file servers 1312 and PCMD databases 1310.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur in a different order. For example, two blocks shown in succession may in fact be executed substantially concurrently, or the blocks may sometimes be executed in the reverse order depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above but only by the following claims and their equivalents.

What is claimed is:

1. A method of operating a computer system to process dropped-call data for a cell tower in a radio access network, the method comprising:

receiving and processing dropped-call data for the cell tower in the radio access network to determine an average geographic distribution of dropped-calls relative to the cell tower and to determine a current geographic distribution of dropped-calls relative to the cell tower;

processing the average geographic distribution and the current geographic distribution to identify dropped-call differences at a plurality of geographic locations;

processing the dropped-call differences to identify ones of the geographic locations that exceed a dropped-call difference threshold;

processing a number of the geographic locations that exceed the dropped-call difference threshold to determine if the number of the geographic locations exceeds a distribution threshold and triggering an alarm if the number of the geographic locations exceeds the distribution threshold;

wherein identifying the dropped-call differences comprises identifying rolling average differences.

2. The method of claim 1 wherein at least one of the geographic locations comprises a building.

3. The method of claim 1 wherein at least one of the geographic locations comprises a city.

4. The method of claim 1 wherein at least one of the geographic locations comprises a road.

5. A computer system to process dropped-call data for a cell tower in a radio access network, the computer system comprising:

a communication interface configured to receive dropped-call data for the cell tower in the radio access network and to transfer an alarm; and a processing system configured to process the dropped-call data to determine an average geographic distribution of dropped-calls relative to the cell tower and a current geographic distribution of the dropped-calls relative to the cell tower, process the average geographic distribution and the current geographic distribution to identify dropped-call differences at a plurality of geographic locations, process the dropped-call differences to identify ones of the geographic locations that exceed a dropped-call difference threshold, process a number of the geographic locations that exceed the dropped-call difference threshold to determine if the number of the geographic locations exceeds a distribution threshold, and to trigger the alarm if the number of the geographic locations exceeds the distribution threshold;

wherein identifying the dropped-call differences comprises identifying rolling average differences.

6. The computer system of claim 5 wherein at least one of the geographic locations comprises a building.

7. The computer system of claim 5 wherein at least one of the geographic locations comprises a city.

8. The computer system of claim 5 wherein at least one of the geographic locations comprises a road.

9. A computer apparatus to process dropped-call data for a cell tower in a radio access network, the apparatus comprising:

software configured to direct a computer system, when executed by the computer system, to process the dropped-call data to determine an average geographic distribution of dropped-calls relative to the cell tower and a current geographic distribution of the dropped-calls relative to the cell tower, process the average geographic distribution and the current geographic distribution to identify dropped-call differences at a plurality of geographic locations, process the dropped-call differences to identify ones of the geographic locations that exceed a dropped-call difference threshold, process a number of the geographic locations that exceed the dropped-call difference threshold to determine if the number of the geographic locations exceeds a distribution threshold, and to trigger an alarm if the number of the geographic locations exceeds the distribution threshold; and a non-transitory computer-readable medium that stores the software;

wherein the software is configured to direct the computer system, when executed by the computer system, to identify the dropped-call differences by identifying rolling average differences.

10. The computer apparatus of claim 9 wherein at least one of the geographic locations comprises a building.

11. The computer apparatus of claim 9 wherein at least one of the geographic locations comprises a city.

12. The computer apparatus of claim 9 wherein at least one of the geographic locations comprises a road.

* * * * *